United States Patent
Vaidya et al.

(10) Patent No.: US 7,501,478 B2
(45) Date of Patent: Mar. 10, 2009

(54) THERMOPRECIPITATING POLYMER CONTAINING ENZYME SPECIFIC LIGANDS, PROCESS FOR THE PREPARATION THEREOF, AND USE THEREOF FOR THE SEPARATION OF ENZYMES

(75) Inventors: Alankar Arun Vaidya, Pune (IN); Bhalchandra Shripad Lele, Pune (IN); Mohan Gopalkrishna Kulkarni, Pune (IN); Raghunath Anant Mashelkar, Pune (IN)

(73) Assignee: Council of Scientific and Industrial Research, New Delhi (IN)

(*) Notice: Subject to any disclaimer, the term of this patent is extended or adjusted under 35 U.S.C. 154(b) by 434 days.

(21) Appl. No.: 11/047,164

(22) Filed: Jan. 31, 2005

(65) Prior Publication Data
US 2005/0130867 A1    Jun. 16, 2005

Related U.S. Application Data

(62) Division of application No. 10/127,322, filed on Apr. 22, 2002, now Pat. No. 6,867,268, which is a division of application No. 09/725,641, filed on Nov. 29, 2000, now Pat. No. 6,605,714.

(51) Int. Cl.
C08F 2/00    (2006.01)
C08G 85/00    (2006.01)

(52) U.S. Cl. .................. 526/72; 526/75; 560/1; 562/400

(58) Field of Classification Search ........... None
See application file for complete search history.

(56) References Cited

U.S. PATENT DOCUMENTS
4,711,840 A    12/1987    Nowinski et al.

FOREIGN PATENT DOCUMENTS
EP    922715 A2    6/1999

OTHER PUBLICATIONS

Bahulekar et al. Carbohydrate Polymers (1998), vol. 37, pp. 71-78.*

* cited by examiner

*Primary Examiner*—Patrick T Lewis
(74) *Attorney, Agent, or Firm*—Ladas and Parry LLP

(57) ABSTRACT

The present invention provides novel thermoprecipitating polymers of formula 1 containing novel enzyme sensitive ligands of the formula 4, processes for the preparation thereof respectively, and to the use thereof for the separation of enzymes. In formula 1 R is hydrogen or methyl, 1 is an integer in the range of from 1 to 10, m and n are either 0 or 1, x and y are integers greater than 1.

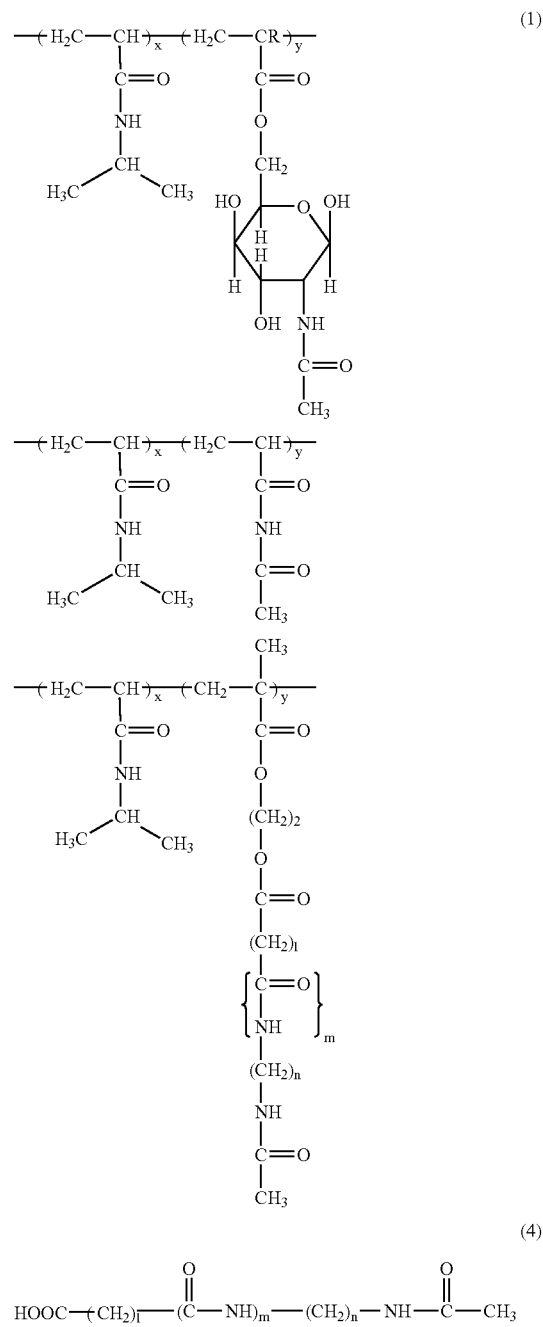

11 Claims, 1 Drawing Sheet

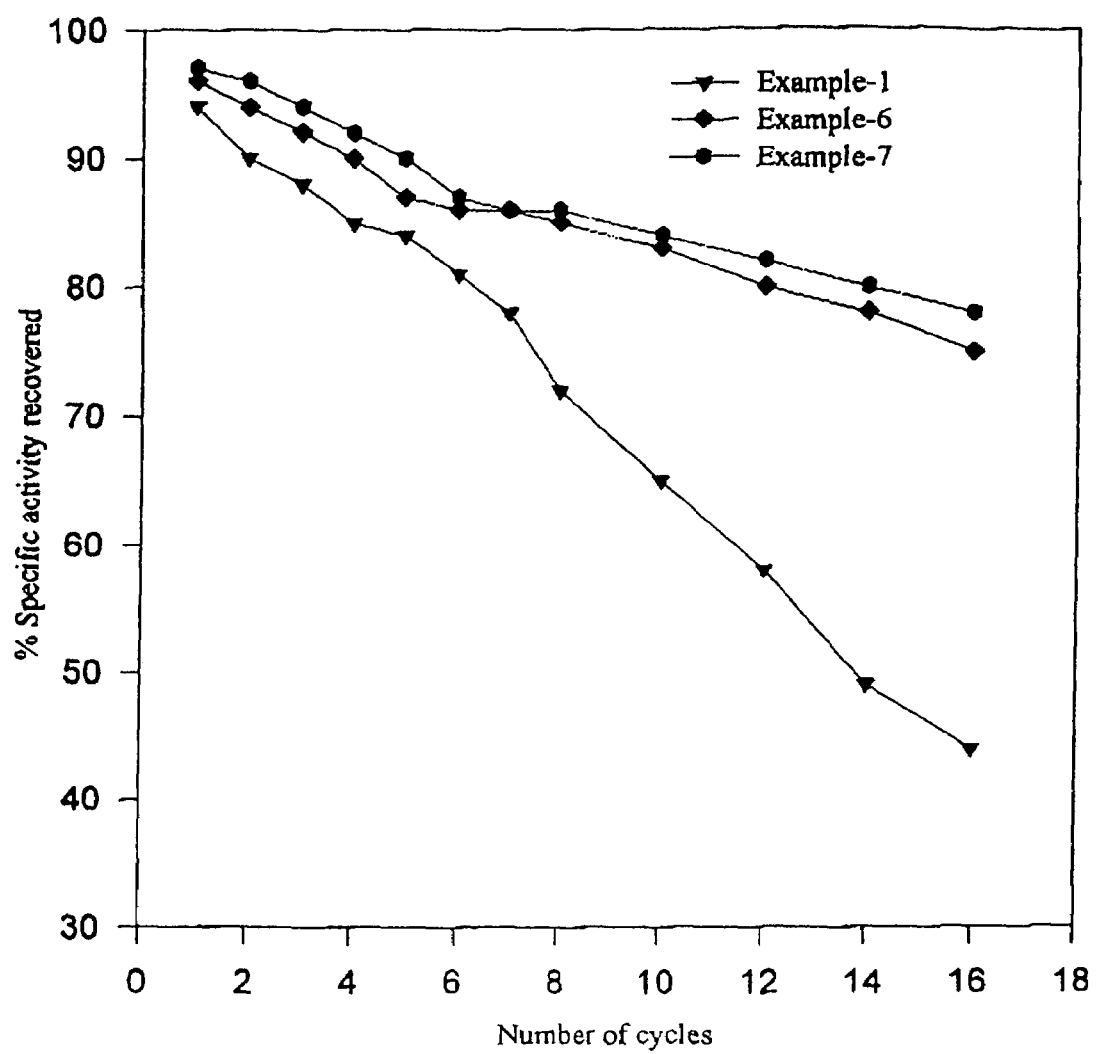
Figure I : Comparison of stability of different affinity thermoprecipitating polymers.

THERMOPRECIPITATING POLYMER CONTAINING ENZYME SPECIFIC LIGANDS, PROCESS FOR THE PREPARATION THEREOF, AND USE THEREOF FOR THE SEPARATION OF ENZYMES

This application is a divisional of application Ser. No. 10/127,322 filed on Apr. 22, 2002, now U.S. Pat. No. 6,867,268 which is a divisional of application Ser. No. 09/725,641 filed on Nov. 29, 2000 now U.S. Pat. No. 6,605,714 claims the benefit thereof and incorporates the same by reference.

FIELD OF THE INVENTION

The present invention relates to novel thermoprecipitating polymers containing enzyme specific ligands. The present invention also relates to a process for the preparation of such enzyme specific ligands and to monomers embodying such ligands. More particularly, the present invention also relates to a process for the separation of enzymes using such thermoprecipitating polymers. The invention also relates to a process for the separation of lysozyme and lectins from a mixture of proteins and lectins such as wheat germ agglutinin and tomato agglutinin.

BACKGROUND OF THE INVENTION

The separation and recovery of biomolecules like enzymes and glycoproteins are critical cost determining steps in most of the down stream processes in biotechnology industries. Conventionally, separation of lysozyme from the crude sources has been done by salt precipitation (Hasegawa, Mineo, Yoshida, Kazuya, Miyauchi, Sakae, Terazono, Masami: U.S. Pat. No. 4,504,583, (1985)) or by ion exchange techniques (Hasegawa, Mineo, Ozaki, Kitao, U.S. Pat. No. 4,705,755 (1987); Durance, Timothy, Li-Chan, Eunice, Nakai, Shuryo: U.S. Pat. No. 4,966,851 (1990); Hasegawa, Mineo: U.S. Pat. No. 4,518,695 (1985); Takechi, Kaz, Takahashi, Tsuyos, Inaba, Toyoaki, Hasegawa, Eiichi: U.S. Pat. No. 4,104,125 (1978).

Various techniques based on affinity interactions between enzyme-inhibitor, enzyme-substrate, enzyme-transition state analog, enzyme-cofactor and the like have been developed as better alternatives to the above-mentioned conventional systems for the selective recovery of enzymes. Most of the affinity based separations involve polymers to which the affinity ligand or cofactors or dyes are chemically linked. The complex formed between enzyme and the polymeric ligand is subsequently processed to isolate the enzyme.

These alternative systems primarily involve affinity chromatography or affinity ultrafiltration. Although these techniques provide high selectivity, they are beset with several practical difficulties which are summarised below.

Bozzano A G., Glatz C. E., J. Memb.Sci 55, 181-198 (1991); Ehsani N., Parkkinen S., Nystrom M. J. Memb Sci 123, 105-119, (1997) disclose that affinity ultrafiltration is suitable for the separation of enzyme only in cases where the difference between the molecular weights of the desired enzyme and other biomolecules is appreciably large. Also, at high pressures, the denaturation of the enzyme and fouling of the membrane leads to poor product quality (Ehsani N., Parkkinen S., Nystrom M. J. Memb Sci 123, 105-119, (1997)).

Affinity chromatography (Hirano S., Kaneko X, Kitagawa M., Agric. Biol. Chem, 55, 1683-1684 (1991); Safrik L., Safarikova M., J. Biochem Biophys. Methods, 27, 327-330 (1993); Reid, Lorne S.; U.S. Pat. No. 4,552,845 (1985)) is found suitable only for small capacity columns. Scale up of the columns retards the flow rate and leads to dogging of the columns, thereby resulting in increased cost of the process. Another disadvantage of this process is that it is non-continuous since periodic flushing is required at specified time intervals to remove any undesirable non-specifically adsorbed biomolecules in the column (Chern C. S., Lee C. K., Chen C. Y., Yeh M. J., Colloids and Surfaces B. Biointerfaces. 6 37-49, (1996)).

Affinity precipitation eliminates many of the above-mentioned problems and offers certain advantages such as ease of scale up, amenability to continuous operation and recycling of the affinity ligand (Chern C. S., Lee C. K., Chen C. Y., Yeh M. J., Colloids and Surfaces B. Biointerfaces. 6 37-49, (1996)). Affinity precipitation involves the formation of a complex between the enzyme and a stimuli sensitive affinity polymer in a homogeneous solution. This complex is precipitated by a change in the pH, temperature or ionic strength. This complex is dissociated and the polymer is separated by varying either one of the above-mentioned stimuli and the enzyme is then isolated (Gupta M. N., Kaul R., Guogiang D., and Mattiasson B., J. Mol. Recog. 9, 356-359, (1996)). Thus the recovery of the enzyme by this process is much simpler.

It is well known that ligands containing N-acetyl groups such as N-acetylglucosamine, N-acetylmuramic acid, chitin, chitosan, and the like exhibit affinity for various enzymes and lectins (Tyagi R., Kumar A, Sardar M., Kumar S., Gupta M. N., Isol.Purif. 2, 217-226, (1996); Katz, Friedrich D., Fishman, Louis, Levy; U.S. Pat. No. 3,940,317 (1976)).

All the above ligands are derived from glucose. Since glucose is a carbons source for many microbes, such ligands are susceptible to microbial attack and hydrolytic degradation resulting in poor stability of these ligands (Hirano S., Kaneko H., Kitagawa M., Agric. Biol. Chem, 55, 1683-1684 (1991)). Also chitosan is insoluble in alkaline media while crosslinked chitosan and chitin are insoluble in both alkaline and acidic media (Ruckstein, Eli; Zeng, Xianfang; Biotechnology and Bioengineering, 56, 610-617 (1997)). This limits their use. Moreover, chitin and chitosan can undergo transglycosylation and mutarotation, which drastically reduces their efficiency in any affinity based recovery of enzyme (Davies, R. C., Neuberger, A, Wilson, B. M., Biochem Biophys Acta, 178, 294-305, (1969); Neuberger, A, Wilson, B. M., Biochem. Biophys. Acta, 147, 473-486, (1967)). Thus, it is desirable to replace glucose by stable synthetic ligands during the synthesis of thermoprecipitating affinity polymers for enzyme separations.

OBJECTS OF THE INVENTION

It is an object of the invention to provide thermoprecipitating polymers and processes for the preparation thereof, said thermoprecipitating polymers containing ligands having N-acetyl groups.

It is another object of the invention to provide stable synthetic ligands for thermoprecipitating polymers for enzyme separation.

It is another object of the invention, to provide acrylic monomers and process for the preparation thereof which are useful in the synthesis of thermoprecipitating polymers containing the above ligands having N-acetyl groups.

It is a further object of the invention to provide an economical process for the separation of lysozyme using the thermoprecipitating polymers of the invention.

DESCRIPTION OF THE ACCOMPANYING DRAWINGS

FIG. 1 givers the graph of specific activity of the lysozyme recovered in terms of unit activity/unit protein vs. number of cycles.

SUMMARY OF THE INVENTION

Accordingly, the present invention provides thermoprecipitating polymers of the general formula 1

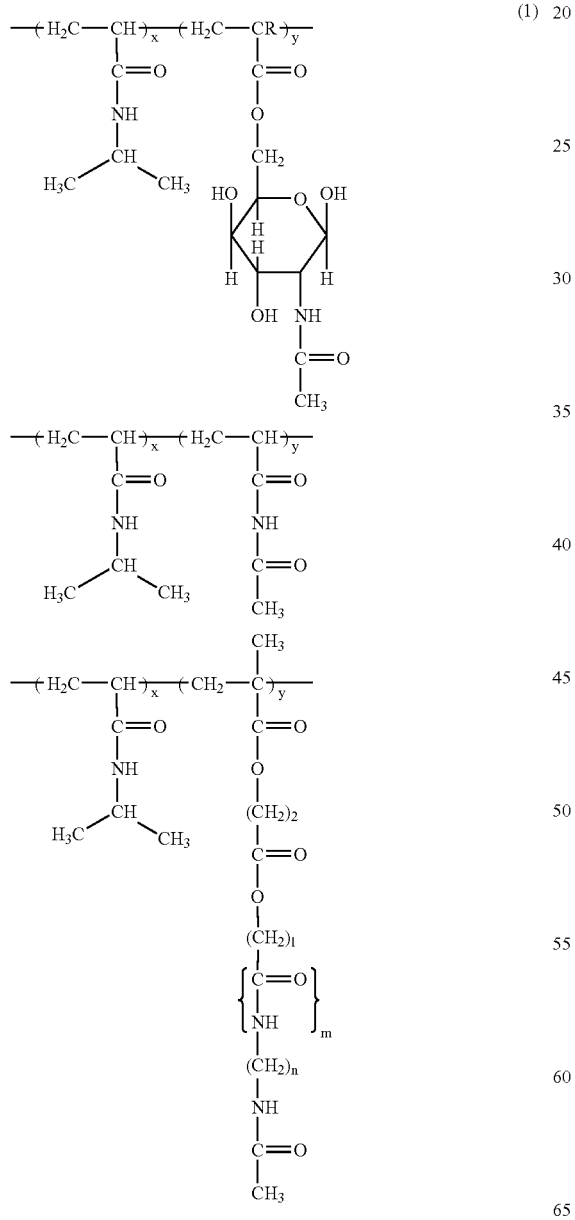

(1)

wherein R is hydrogen or methyl, l is an integer in the range of from 1 to 10, m and n are either 0 or 1, x and y are integers greater than 1.

The present invention also relates to a process for the preparation of thermoprecipitating polymers of the general formula 1

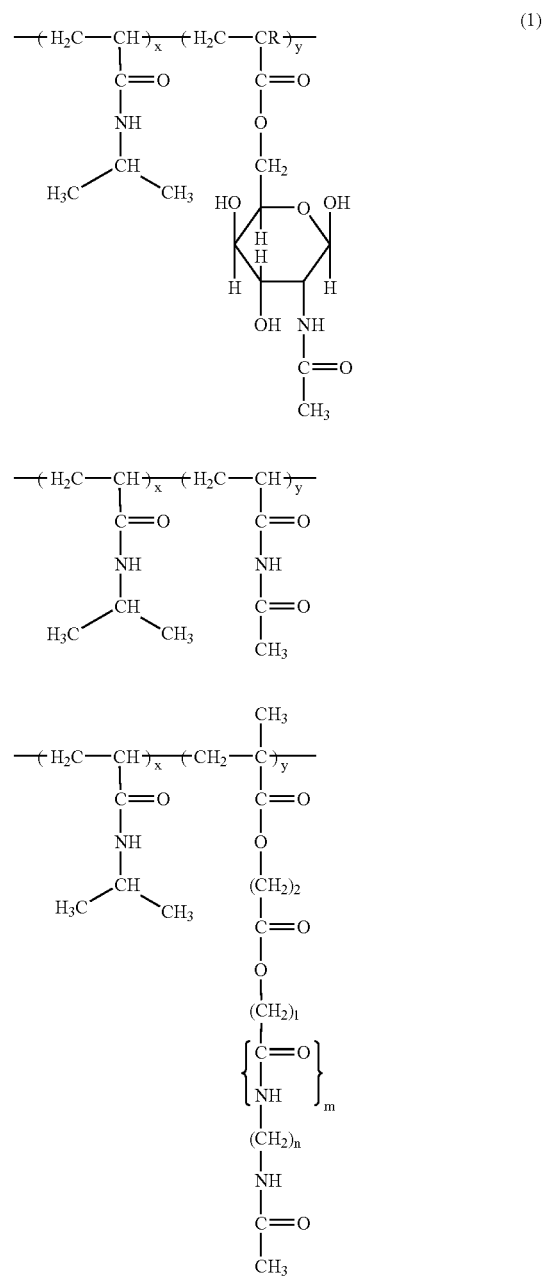

(1)

wherein R is hydrogen or methyl, l is an integer in the range of from 1 to 10, m and n are either 0 or 1, x and y are both integers greater than 1, said process comprising polymersing a thermosensitive monomer of the general formula 3 with an affinity monomer of the general formula 2.

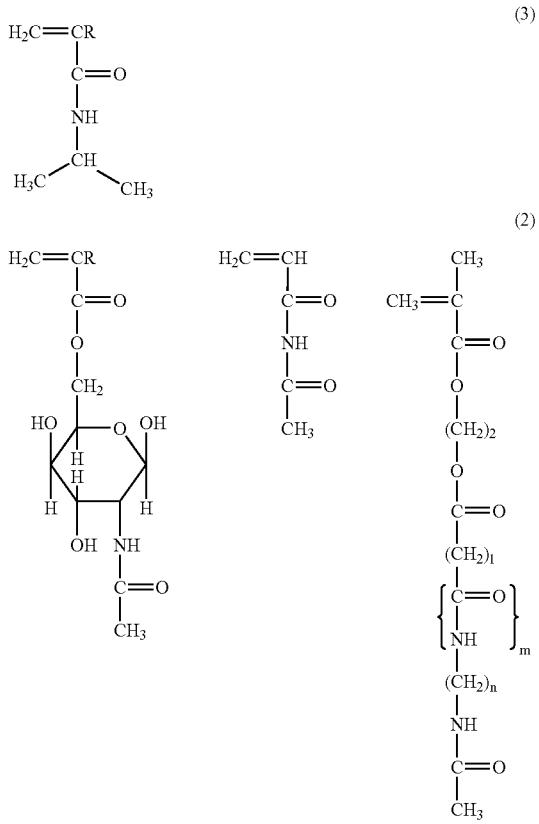

In one embodiment of the invention, the thermosensitive monomer (3) and the affinity polymer (2) are polymerised by free radical polymerisation.

In another embodiment of the invention, the thermosensitive monomer used is selected from the group consisting of N-isopropylacrylamide (NIPAM), N-isopropylmethacrylamide (NIPMAM), N-vinylcaprolactam (NVC) and vinyl pyrrolidone (VP).

In a further embodiment of the invention, the molar ratio of the acrylated N-acetyl group containing ligand to the thermosensitive monomer used is in the range of 1:1 to 1:9.

In yet another embodiment of the invention, the polymerisation initiator is selected from the group consisting of azoisobutyronitrile (AIBN), ammonium persulfate (AMPS) and potassium persulfate.

In a further embodiment of the invention, the polymerisation initiator used is in the range of 5 to 20% by weight of the monomers.

In yet another embodiment of the invention, the polymerisation accelerator used is selected from the group consisting of N,N',N'',N''' tetramethylethylenediamine (TEMED) and sulfite containing compounds such as sodium metabisulfite and potassium metasulfite.

In a further embodiment of the invention, the polymerisation accelerator used is in the range of 1 to 5% by weight of the monomers.

The present invention also relates to novel monomers of the general formula 2 embodying the ligand of formula 4

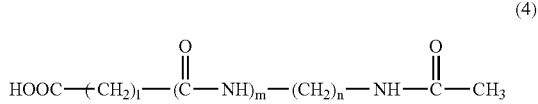

wherein R is hydrogen or methyl, l is an integer in the range of from 1 to 10, m and n are either 0 or 1.

The invention also relates to a process for the preparation of an acrylated monomer of the general formula 2 comprising reacting a ligand containing N-acetyl groups of the general formula 4 with an acrylate monomer in the presence of a condensing agent in a solvent at a temperature in the range of 0-25° C. for a period of 12 to 60 hours to obtain the acrylated monomer of formula 2.

In a further embodiment of the invention, the acrylic monomer is selected form compounds of the formula $H_2C=CR-COCl$ and $H_2C=CCH_3-CO-O-(CH_2)_2-OH$ wherein R is hydrogen or methyl.

In a further embodiment of the invention, the condensing agent is selected from the class of carbodiimide group compounds such as dicyclohexyl carbodiimide (DCC), 1-cyclohexyl 3-(2-morphilinoethyl)carbodiimide metho-p-toluenesulfonate (CMC) and 1-ethyl-3-(3-dimethylaminopropyl) carbodiimide (EDC).

In a further embodiment of the invention, the molar ratio of the ligand containing N-acetyl group to the acrylate monomer is in the range of 1:1 to 1:1.2.

In a further embodiment of the invention, the molar ratio of the condensing agent to the acetamido ligand or acrylate monomer is in the range of 1:1 to 1:1.2.

The present invention also relates to novel ligands of the general formula 4 below

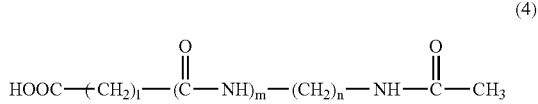

wherein l is an integer in the range of from 1 to 10, m and n are either 0 or 1.

The present invention also relates to a process for the preparation of ligands of the general formula 4 wherein l is an integer in the range of from 1 to 10, m and n are either 0 or 1, said process comprising reacting a straight chain amino acid of the general formula 5

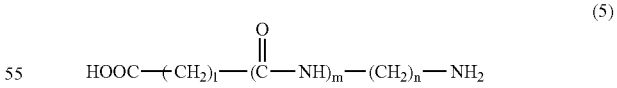

with an acetylating agent in a solvent at a temperature in the range of 0-25° C. for a period in the range of from 1-4 hours to obtain the ligand of formula 4.

In one embodiment of the invention, the straight chain amino acid is selected from compounds of the formula $HOOC-(CH_2)_l-(CO-NH)_m-(CH_2)_n-NH_2$ wherein l is an integer in the range of from 1 to 10, m and n are either 0 or 1.

In another embodiment of the invention, the solvent is selected from the group consisting of NaOH and water.

In a further embodiment of the invention, the acetylating agent is selected from acetic anhydride and acetyl chloride.

In yet another embodiment of the invention, the molar ratio of the acetylating agent to the amino acid is in the range of 1:1 to 1:1.2.

The invention also relates to a process. for the separation of lysozyme comprising polymerising acrylated monomer of the formula 2 with a thermosensitive monomer of the formula 3 in the presence of a polymerisation initiator and polymerisation accelerator in a solvent at 30 to 80° C. for 1 to 12 hours, to obtain the thermoprecipitating affinity polymer of formula 1, contacting the aqueous solution of the polymer with an aqueous solution of lysozyme or a mixture of lysozyme and other proteins at a temperature in the range of 4 to 20° C. for a time period in the range of 1 to 16 hours followed by raising the temperature above the LCST of the polymer, isolating the precipitated polymer-lysozyme complex, redissolving the said complex in an acidic aqueous solution, raising the temperature of the solution above the LCST of the polymer, isolating the precipitated polymer and recovering lysozyme from the solution.

DETAILED DESCRIPTION OF THE INVENTION

The N-acetyl group containing ligands are synthesised by dissolving straight chain amino acids of the formula HOOC—$(CH_2)_1$—(CO—NH)$_m$—$(CH_2)_n$—$NH_2$ wherein 1 is an integer in the range of 1 to 10 and m and n are either 0 or 1 and equimolar NaOH in water at 5-20° C., adding the acetylating agent dropwise to the above solution while maintaining, the pH in the range of 7.4-7.8 by the addition of NaOH, stirring the reaction mixture for 2 hours at 25° C., acidifying to pH 2.0, precipitating the product by cooling to 4° C. for 24 hours, reprecipitating the product from water into acetone.

The monomers containing acrylated N-acetyl group are synthesised by dissolving the affinity lignad of the formula HOOC—$(CH_2)_1$—(CO—NH)$_m$—$(CH_2)_n$—NH—CO—$CH_3$ wherein 1 is an integer in the range of from 1 to 10 and m and n are either 0 or 1, and acrylate monomer having the formula $H_2C$=CR—COCl or $H_2C$=$CCH_3$—CO—O—$(CH_2)_2$—OH wherein R is either hydrogen or methyl, and a condensing agent in tetrahydrofuran, at 5-20° C., stirring this reaction mixture for 48 hours at the same temperature, filtering the precipitate and concentrating the filtrate to obtain the viscous liquid, pouring this liquid into cold water to precipitate the product and then drying the product and preserving it under petroleum at 4° C.

The affinity precipitating polymers of the general formula 1 are prepared by dissolving the monomer containing acrylated N-acetyl group of the formula 2 and thermosensitive monomer of the formula 3 in water or dimethylformamide (DMF), purging this reaction mixture with nitrogen for 10 to 30 minutes at 37 and 80° C. respectively, adding polymerisation initiator and polymerisation accelerator, allowing polymerisation to proceed for 5 to 8 hours under nitrogen purging at the same temperature, precipitating the product either by increasing the temperature of the aqueous solution above the LCST or in diethyl ether.

The, separation of lysozyme from other proteins is carried out using the thermoprecipitating polymer of the invention. An aqueous solution of the polymer is mixed with lysozyme-ovalbumin mixture allowing equilibrium for 8 to 24 hours, at 4 to 20° C., raising the solution temperature above the LCST (21 to 45° C.) of the affinity polymer thereby precipitating the polymer-lysozyme complex, separating the precipitated complex by centrifugation, redissolving the complex in an acidic solution and again raising the temperature of the solution above the LCST of the affinity polymer, and then separating the filtrate containing free lysozyme by centrifugation, repeating the procedure for sixteen cycles for determination of reusability and stability of the polymers of the invention during recovery of lysozyme.

Although the present invention describes a process for the synthesis of ligands containing pendant N-acetyl groups and acrylated monomers containing N-acetyl groups and their subsequent use in the preparation of thermoprecipitating polymers useful in the enhanced recovery of lysozyme from a mixture of lysozyme and ovalbumin as well as reusability and enhanced stability of these polymers during recovery of lysozyme, the scope of the present invention is not and should not be construed to be limited to only such affinity polymers for the separation of lysozyme but can extend to such combinations of polymer bound affinity ligands and enzymes or lectins to which such ligands bind selectively.

The invention is also not limited to those ranges provided herein. The ranges and limitations provided herein are believed to particularly point out the invention. However, other ranges and limitations which perform substantially the same function in the same or substantially the same manner to obtain the same or substantially the same results are intended to be within the scope of the instant invention.

EXAMPLE 1

11.1 g (0.05 M) N-acetylglucosamine and 4.2 g (0.05M) sodium bicarbonate was dissolved in 100 ml water. To this 5 ml (0.06M) acryloyl chloride in 5 ml dichloromethane (DCM) was added dropwise over a period of 30 minutes at 15° C. During this period the pH of the solution was maintained at 7.5 by adding saturated sodium bicarbonate solution. After the addition of acryloyl chloride was over and the pH of the reaction mixture was steady, unreacted acryloyl chloride was extracted in 100 ml ethyl acetate. The clear aqueous solution was separated and acidified to pH 5.0 by concentrated HCl. Then the product (Ac.NAG) was previpitated in acetone and maintained at 4° C. overnight to maximise the precipitation. The precipitated product was filtered. The product was reprecipitated from water into acetone. The thermoprecipitating polymer containing this monomer was prepared as follows: 0.238 g (0.07M) NIPAM, 0.248 g (0.03M) Ac.NAG were dissolved in 30 ml of water taken in a round bottom flask. Polymerisation was initiated at 37° C. under nitrogen purging by the addition of 10 (w/w) of AMPS and 1% v/w of TEMED. Polymerisation was allowed to proceed for 6 hours at 37° C. Then, the polymer was precipitated by raising the temperature of the reaction mixture above the LCST of the polymer. The precipitated polymer was washed twice with cold double distilled water and once with cold 0.066 M phosphate buffer (pH 6.2) and dried under vacuum at room temperature.

EXAMPLE 2

21.3 g of acrylamide (0.3M), 0.5 g 4-(dimethylamino)-pyridine and 24.2 ml (0.3M) pyridine was dissolved in 800 ml HPLC grade THF. The reaction mixture was stirred at 10° C. to obtain a clear solution. Then 21.3 ml (0.3M) acetyl chloride in 22 ml THF was added dropwise to the above reaction mixture over 1 hour. After the addition of acetyl chloride was over, a sticky yellow precipitate of pyridine-HCl was obtained. This precipitate was filtered under vacuum to obtain a clear THF solution, which was then concentrated under vacuum at 40° C. to obtain a semisolid mass. This was precipitated in petroleum ether to get a low melting semisolid product (acetylacrylamide). The polymerisation comprising this monomer was carried out as follows: 0.238 g (0.07M) NIPAM and 0.102 g (0.03M) acetylacrylamide were dissolved in 30 ml of water taken in a round bottom flask. Polymerisation was initiated at 3 7° C. under nitrogen purging by the addition of 10 (w/w) of AMPS and 1% v/w of TEMED. Polymerisation was allowed to proceed for 6 hours at 37° C. Then, the polymer was precipitated by raising the temperature of the reaction mixture above the LCST of the polymer. The precipitated polymer was washed twice with cold double distilled water and once with cold 0.066M phosphate buffer (pH 6.2) and dried under vacuum at room temperature.

EXAMPLE 3

7.5 g (0.1M) glycine and 4 g (0.1M) sodium hydroxide was dissolved in 80 ml water. To it 9.5 ml (0.1M) acetic anhydride was added over a period of 30 minutes at 15° C. During this addition, pH of the reaction mixture was maintained at 7.5. After the addition was over, the reaction mixture was stirred for two hours and acidified to pH 2.0 by concentrated HCl. It was maintained at −4° C. overnight. This reaction mixture was allowed to thaw and the precipitated product (2-acetamido glycine) was filtered. The product was reprecipitated from water into acetone. The monomer (2,(methacryloyl)oxy 2, ethylacetamidoglycinate) was prepared as follows: in a round bottom flask, 4.1 g (0.035M) 2-acetamido glycine, 4.3 ml (0.035M) 2, hydroxyethylmethacrylate (HEMA), 4.8 g (0.035M) 1,hydroxybenzotriazole were dissolved in 300 ml dry THF. This reaction mixture was stirred at 15° C. under dry conditions to obtain a clear solution. Then, 7.3 g (0.035M) DCC dissolved in 10 ml of THF was added to the above reaction mixture. It was allowed to stir at 15° C. for 48 hours. A heavy white precipitate of dicyclohexyl urea salt was filtered and the clear filtrate was concentrated under vacuum at 40° C. to obtain an oily semisolid mass. This was precipitated in cold water. The white product obtained was dried and preserved under hexane at 4° C. till further use. Thermoprecipitating polymer was prepared as follows: 0.40 g (0.07M) NIPAM and 0.28 g (0.03M) 2,(methacryloyl)oxyethyl 2,acetamidoglycinate were dissolved in 50 ml of dry DMF taken in a round bottom flask. This was allowed to stir under continuous nitrogen purging to obtain a clear solution. Then, the solution temperature was slowly raised to 80° C. Polymerisation was initiated by adding 10% (w/w) of AIBN dissolved in 1 ml DMF. This reaction was maintained at 80° C. for 6 hours under continuous nitrogen purging The mass was cooled to 37° C. and the polymer was precipitated in diethyl ether. The precipitated product was dried at 40° C.

EXAMPLE 4

8.9 g (0.1 M) β alanine and 4 g (0.1M) sodium hydroxide was dissolved in 80 ml water. To it, 9.5 ml (0.1M) acetic anhydride was added over a period of 30 minutes at 15° C. During this addition pH of the reaction mixture was maintained at 7.5. After the addition was over, this reaction mixture was stirred for two hours and acidified to pH 2.0 by concentrated HCl. It was maintained at −4° C. overnight. This reaction mixture was allowed to thaw and the precipitated product (3-acetamido βalaninate) was filtered. The product was reprecipitated from water into acetone. The monomer 2,(methacryloyl)oxyethyl 3-acetamidoβalaninate) was prepared as follows: in a round bottom flask 4.6 g (0.035M) 3-acetamido βalaninate and 4.3 ml (0.035M) 1,hydroxybenzotriazole were dissolved in 300 ml dry THF. This reaction mixture was stirred at 15° C. under dry conditions to obtain a clear solution. Then, 7.3 g (0.035M) DCC dissolved in 10 ml of THF was added to the above reaction mixture. It was allowed to stir at 15° C. for 48 hours. A heavy white precipitate of dicyclohexyl urea salt was filtered and the clear filtrate was concentrated under vacuum at 40° C. to obtain an oily semisolid mass. It was dissolved in minimum amount of dry ethyl acetate and this clear solution was precipitated in petroleum ether to obtain white solid, which was kept over petroleum ether till further use. Thermoprecipitating polymer was prepared as follows: 0.40 g (0.07M) NIPAM and 0.36 g (0.03M) 2,(methacryloyl)oxyethyl 2,acetamidoβalaninate were dissolved in 50 ml of dry DMF taken in a round bottom flask This was allowed to stir under continuous nitrogen purging to obtain a clear solution. Then, the solution temperature was slowly raised to 80° C. Polymerisation was initiated by adding 10% (w/w) of AIBN dissolved in 1 ml DMF. This reaction was maintained at 80° C. for 6 hours under continuous nitrogen purging, The mass was cooled to 37° C. and the polymer was precipitated in diethyl ether. The precipitated product was dried at 40° C.

EXAMPLE 5

10.3 g (0.1 M) 4 amino butyric acid and 4 g (0.1M) sodium hydroxide was dissolved in 80 ml water. To it, 9.5 ml (0.1M) acetic anhydride was added over a period of 30 minutes at 15° C. During this addition pH of the reaction mixture was maintained at 7.5. After the addition was over, this reaction mixture was stirred for two hours and acidified to pH 2.0 by concentrated HCl. It was maintained at −4° C. overnight. This reaction mixture was allowed to thaw and the precipitated product (4-acetamido butyric acid) was filtered. The product was reprecipitated from water into acetone. The monomer 2,(methacryloyl)oxyethyl 4-acetamidobutyrate) was prepared as follows: in a round bottom flask 5.1 g (0.035M) 4-acetamido butyric acid and 4.3 ml (0.035M) HEMA and 4.8 g (0.035M) 1, hydroxybenzotriazole were dissolved in 300 ml dry THF. This reaction mixture was stirred at 15° C. under dry conditions to obtain a clear solution. Then, 7.3 g (0.035M) DCC dissolved in 10 ml of THF was added to the above reaction mixture. It was allowed to stir at 15° C. for 48 hours. A heavy white precipitate of dicyclohexyl urea salt was filtered and the clear filtrate was concentrated under vacuum at 40° C. to obtain an oily semisolid mass. This was precipitated in cold water. The white product obtained was dried and preserved under hexane at 4° C. till further use. Thermoprecipitating polymer was prepared as follows: 0.40 g (0.07M) NIPAM and 0.39 g (0.03M) 2,(methacryloyl)oxyethyl 4-acetamidobutyrate were dissolved in 50 ml of dry DMF taken in a round bottom flask. This was allowed to stir under continuous nitrogen purging to obtain a clear solution. Then, the solution temperature was slowly raised to 80° C. Polymerisation was initiated by adding 10% (w/w) of AIBN dissolved in 1 ml DMF. This reaction was maintained at 80° C. for 6 hours under continuous nitrogen purging. The mass was cooled to 37° C. and the polymer was precipitated in diethyl ether. The precipitated product was dried at 40° C.

EXAMPLE 6

13.1 g (0.1 M) 6-amino caproic acid and 4 g (0.1M) sodium hydroxide was dissolved in 80 ml water. To it, 9.5 ml (0.1M) acetic anhydride was added over a period of 30 minutes at 15° C. During this addition pH of the reaction mixture was maintained at 7.5. After the addition was over, this reaction mixture was stirred for two hours and acidified to pH 2.0 by concentrated HCl. It was maintained at −4° C. overnight. This reaction mixture was allowed to thaw and the precipitated product (6-acetamidocaproic acid) was filtered. The product was reprecipitated from water into acetone. The monomer 2,(methacryloyl)oxyethyl 6-acetamidocaproate) was prepared as follows: in a round bottom flask 6.1 g (0.035M) 6-acetamido caproic acid and 4.3 ml (0.035M) and 4.8 g (0.035M) 1, hydroxybenzotriazole were dissolved in 300 ml dry THF. This reaction mixture was stirred at 15° C. under dry conditions to obtain a clear solution. Then, 7.3 g (0.035M) DCC dissolved in 10 ml of THF was added to the above reaction mixture. It was allowed to stir at 15° C. for 48 hours. A heavy white precipitate of dicyclohexyl urea salt was filtered and the clear filtrate was concentrated under vacuum at 40° C. to obtain an oily semisolid mass. This was precipitated in cold water. The white product obtained was dried and preserved under hexane at 4° C. till further use. Thermoprecipitating polymer was prepared as follows: 0.40 g (0.07M) NIPAM and 0.43 g (0.03M) 2,(methacryloyl)oxyethyl 6-acetamidocaproate were dissolved in 50 ml of dry DMF taken in a round bottom flask. This was allowed to stir under continuous nitrogen purging to obtain a clear solution. Then, the solution temperature was slowly raised to 80° C. Polymerisation was initiated by adding 10% (w/w) of AIBN dissolved in 1 ml DMF. This reaction was maintained at 80° C. for 6 hours under continuous nitrogen purging. The mass was cooled to 37° C. and the polymer was precipitated in diethyl ether. The precipitated product was dried at 40° C.

EXAMPLE 7

13.2 g (0.1 M) glycylglycine and 8.4 g (0.1M) sodium bicarbonate was dissolved in 80 ml water. To it, 9.5 ml (0.1M) acetic anhydride was added over a period of 30 minutes at 15° C. During this addition pH of the reaction mixture was maintained at 7.5 by the addition of saturated solution of lime. After the addition was over, this reaction mixture was stirred for two hours and acidified to pH 2.0 by concentrated HCl. It was maintained at −4° C. overnight. This reaction mixture was allowed to thaw and the precipitated product (acetamido glycylglycinate) was filtered. The product was reprecipitated from water into acetone. The monomer 2,(methacryloyl)oxyethyl acetamidoglycylglycinate) was prepared as follows: in a round bottom flask 6.1 g (0.035M) acetamido glycylglycinate and 4.3 ml (0.035M) HEMA and 4.8 g (0.035M) 1, hydroxybenzotriazole were dissolved in 300 ml dry THF. This reaction mixture was stirred at 15° C. under dry conditions to obtain a clear solution. Then, 7.3 g (0.035M) DCC dissolved in 10 ml of THF was added to the above reaction mixture. It was allowed to stir at 15° C. for 48 hours. A heavy white precipitate of dicyclohexyl urea salt was filtered and the clear filtrate was concentrated under vacuum at 40° C. to obtain an oily semisolid mass. This was precipitated in cold water. The white product obtained was dried and preserved under hexane at 4° C. till further use. Thermoprecipitating polymer was prepared as follows: 0.40 g (0.07M) NIPAM and 0.43 g (0.03M) 2, (methacryloyl) oxyethyl acetamido glycylglycinate were dissolved in 50 ml of dry DMF taken in a round bottom flask. This was allowed to stir under continuous nitrogen purging to obtain a clear solution. Then, the solution temperature was slowly raised to 80° C. Polymerisation was initiated by adding 10% (w/w) of AIBN dissolved in 1 ml DMF. This reaction was maintained at 80° C. for 6 hours under continuous nitrogen purging. The mass was cooled to 37° C. and the polymer was precipitated in diethyl ether. The precipitated product was dried at 40° C.

EXAMPLE 8

Relative binding of affinity thermoprecipitating polymer was determined following a procedure reported by Neuberger and Wilson, Biochem. Biophys. Acta 147, 473-486 (1967).

The concentration of N-acetyl groups required to obtain 35% relative binding i.e. $I_{35}$ for various thermoprecipitating affinity polymers is summarized in Table 1.

TABLE 1

Relative binding of thermoprecipitating polymers

| No. | Affinity thermoprecipitating polymer | mM N-acetyl groups for $I_{35}$ |
|---|---|---|
| 1 | Example 1 | 0.0050 ± 0.0004 |
| 2 | Example 2 | 0.0160 ± 0.002 |
| 3 | Example 3 | 0.0120 ± 0.001 |
| 4 | Example 4 | 0.0120 ± 0.001 |
| 5 | Example 5 | 0.0032 ± 0.0004 |
| 6 | Example 6 | 0.0024 ± 0.0002 |
| 7 | Example 7 | 0.0022 ± 0.0001 |

EXAMPLE 9

Ten millilitres of respective 1% w/v thermoprecipitating polymer solution was mixed with lysozyme and ovalbumin (27 μg/ml respectively) synthetic mixture. This solution was incubated at 20° C. for 16 hours with continuous shaking at 200 rpm. Then, the temperature of the mixture was raised above the LCST of the polymer to precipitate the lysozyme-polymer complex. The complex was separated by centrifugation at 10000 rpm for 20 minutes above LCST. The precipitated polymer was dissolved in dilute acetic acid solution (pH 2.0). The temperature of this dissociated complex was raised above LCST and the precipitated polymer was separated by centrifugation. The clear filtrate was assayed for lysozyme using *Micrococcus lysodeikticus* as a substrate following the procedure reported by Neuberger and Wilson, Biochem. Biophys. Acta, 147, 473-486, (1967). Lysozyme recovery was estimated in terms of unit activity recovered/mM of N-acetyl groups present in the polymer and the date is given in Table 2.

TABLE 2

Recovery of lysozyme from lysozyme-ovalbumin mixture

| No. | Affinity thermo-precipitating polymer | Unit activity of lysozyme recovered/mM N-acetyl groups from ovalbumin mixture |
|---|---|---|
| 1 | Example 1 | 17590 ± 200 |
| 2 | Example 2 | 6352 ± 70 |
| 3 | Example 3 | 6657 ± 72 |
| 4 | Example 4 | 7978 ± 65 |
| 5 | Example 5 | 22516 ± 220 |
| 6 | Example 6 | 16484 ± 175 |
| 7 | Example 7 | 33672 ± 320 |

EXAMPLE 10

Ten millilitres of respective 1% w/v thermoprecipitating polymer solution was mixed with 27 μg/ml lysozyme solution. It was allowed to incubate at 20° C. for 16 hours. Then, the temperature of the mixture was raised above the LCST of the polymer to precipitate the lysozyme-polymer complex. The complex was separated by centrifugation at 10000 rpm for 20 minutes above LCST. The precipitated polymer was dissolved in dilute acetic acid solution (pH 2.0). The temperature of this dissociated complex was raised above LCST and the precipitated polymer was separated by centrifugation. The clear filtrate was assayed for protein content using Lowrey's procedure and activity of lysozyme was measured using *Micrococcus lysodeikticus* as a substrate following the procedure reported by Neuberger and Wilson, Biochem. Biophys. Acta, 147, 473-486, (1967). The graph of specific activity recovered in terms of unit activity/unit protein vs. number of cycles is given in FIG. 1.

The data in Table 2 shows that the activity of lysozyme revoered per mM of acetamido groups increased from 6657 units (see Example 3) to 33672 units (see Example 7). Thus, in a lysozyme-ovalbumin mixture thermoprecipitating polymers exhibit selectivity towards lysozyme. The percent recovery in terms of specific activity (unit activity/unit protein) as a function of the number of cycles is shown in FIG. 1. The data shows that even after 16 cycles the decrease in the percent recovery in terms of specific activity was 21% and 20% in the case of Example 6 and Example 7 respectively. But for Example 1, the decrease in the percent recovery in terms of specific activity was 50%. Thus, the polymers synthesised as reported in this invention are more stable as compared to NAG containing polymer. Moreover, these polymers are reusable for 16 continuous cycles of solubility/precipitation.

ADVANTAGES OF THE INVENTION

1. The process of the present invention enables synthesis of thermoprecipitating affinity polymers exhibiting enhanced interactions with the enzyme and thereby giving high recovery of the desired enzyme.
2. The synthetic affinity polymers synthesized in the present invention are reusable and stable during the recoveries of the enzyme as compared to the N-acetylglucosamine containing polymers.

REFERENCES

US Patents:
1. U.S. Pat. No. 4,504,583 Mineo et al
2. U.S. Pat. No. 4,705,755 Hasegawa et al
3. U.S. Pat. No. 4,966,851 Timothy et al
4. U.S. Pat. No. 4,518,695 Hasegawa et al
5. U.S. Pat. No. 4,104,125 Kaz et al
6. U.S. Pat. No. 4,552,845 Reid et al
7. U.S. Pat. No. 3,940,317 Katz et al

PUBLICATIONS

1. Bozzano A. G., Glatz C. E. *J. Memb. Sci.* 55 181-198 (1991)
2. Chem C. S., Lee C. K., Chen C. Y., Yeh M. J. *Colloids and Surfaces B. Biointerfaces,* 637-49 (1996)
3. Davies R. C., Neuberger A., Wilson B. M., *Biochim. Biophys. Acta,* 178 294-305 (1969)
4. Ehsani N., Parkkinen S., Nystrom M., *J. Memb. Sci.* 123, 105-119, (1997)
5. Gupta M. N., Kaul R., Guogiang D., Mattiasson B., *J. Mol. Recog.,* 9, 356-359, (1996)
6. Hirano S;, Kancko H., Kitagawa M., *Agric. Biol. Chem* 55, 1683-1684, (1991)
7. Kobayashi, Kazukiyo; Kamiya, Shoko; Matsuyama, Minoru; Murata, Takeomi; Usui, Taichi, *Polymer Journal,* 30, 653-658 (1998)
8. Neuberger A., Wilson B. M., *Biochim. Biophys. Acta.,* 147, 473-486 (1967)
9. Ruckenstein, Eli; Zeng, Xianfang, *Biotechnology and Bioengineering,* 56, 610-617, (1997)
10. Safrik I., Safarikova M., *J. Biochem. Biophys. Methods,* 27, 327-330, (1993)
11. Tyagi R., Kumar A., Sardar M., Kumar S., Gupta M. N., *Isol. Purif,* 2, 217-226, (1996)

We claim:

1. A compound of Formula 4

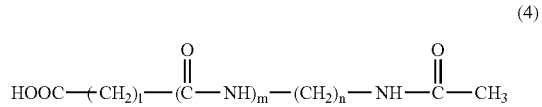

wherein 1 is an integer of from 1 to 10, m is 0 or 1 and n is 0 or 1.

2. A process for the preparation of a ligand of Formula 4

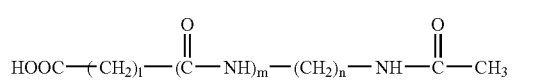

wherein 1 is an integer of from 1 to 10, m is 0 or 1 and n is 0 or 1 comprising the steps of reacting a straight chain amino acid of Formula 5

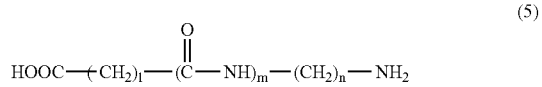

wherein 1 is an integer of from 1 to 10, m is 0 or 1 and n is 0 or 1 with an acetylating agent in a solvent at a temperature in the range of 0-25° C. for a period in the range of from 1-4 hours to obtain the ligand of Formula 4.

3. The process as claimed in claim 2, wherein the solvent is a solution of NaOH and water.

4. The process as claimed in claim 2, wherein the acetylating agent is selected from the group consisting of acetic anhydride and acetyl chloride.

5. The process as claimed in claim 2, wherein the molar ratio of the acetylating agent to the amino acid of formula 5 is in the range of 1:1 to 1:1.2.

6. A process for preparing an acrylated monomer selected from a compound of the formulas

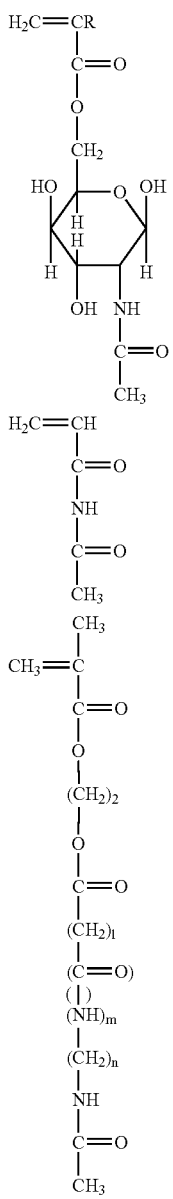

(2a)

(2b)

(2c)

wherein R is hydrogen or methyl, l is an integer from 1 to 10, m is 0 or 1 and n is 0 or 1, comprising the steps of a) reacting a ligand of Formula 4

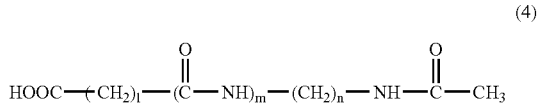

(4)

wherein l is an integer of from 1 to 10, m is 0 or 1 and n is 0 or 1 with an acrylate monomer in the presence of a condensing agent in a solvent at a temperature in the range of 0-25° C. for a period of 12 to 60 hours to obtain the acrylated monomer of formula (2a), (2b), or (2c).

7. The process as claimed in claim 6, wherein acrylate monomer is selected from the group consisting of $H_2C=CR-COCl$ and $H_9C=CCH_3=CO-O-(CH_2)_2-OH$ where R is hydrogen or methyl.

8. The process as claimed in claim 6, wherein the condensing agent is a carbodiimide group.

9. The process according to claim 8, wherein the carbodiimide is selected from the group consisting of dicyclohexyl carbodiimide (DCC), 1-cyclohexyl 3-(2-morphilinoethyl) carbodiimide metho-p-toluenesulfonate (CMC) and 1-ethyl-3-(3-dimethylaminopropyl) carbodiimide (EDC).

10. The process as claimed in claim 6, wherein the molar ratio of the ligand containing N-acetyl group to the acrylate monomer is in the range of 1:1 to 1:1.2.

11. The process as claimed in claim 6, wherein the molar ratio of the condensing agent to the ligand or acrylate monomer is in the range of 1:1 to 1:1.2.

\* \* \* \* \*